(12) United States Patent
Vuong et al.

(10) Patent No.: US 6,959,222 B1
(45) Date of Patent: Oct. 25, 2005

(54) ACCELERATOR ENGINE FOR PROCESSING FUNCTIONS USED IN AUDIO ALGORITHMS

(75) Inventors: Kent Vuong, San Jose, CA (US);
Michael Pan, Escondido, CA (US);
Ernest Seagraves, Mt View, CA (US)

(73) Assignee: New Japan Radio Co., Ltd., Kamifukuoka (JP)

( * ) Notice: Subject to any disclaimer, the term of this patent is extended or adjusted under 35 U.S.C. 154(b) by 0 days.

(21) Appl. No.: 09/548,849

(22) Filed: Apr. 13, 2000

(51) Int. Cl.[7] ............................................. G06F 17/00
(52) U.S. Cl. ....................................... 700/94; 708/200
(58) Field of Search .......................... 700/94; 704/229; 708/300, 400, 403, 404, 406, 513, 508, 200; 718/100; 712/212

(56) References Cited

U.S. PATENT DOCUMENTS

| | | | | |
|---|---|---|---|---|
| 5,901,301 A | * | 5/1999 | Matsuo et al. ............... | 712/212 |
| 6,253,293 B1 | * | 6/2001 | Rao et al. .................... | 711/147 |
| 6,311,204 B1 | * | 10/2001 | Mills ........................... | 718/100 |
| 6,405,227 B1 | * | 6/2002 | Prakash ....................... | 708/300 |
| 6,430,529 B1 | * | 8/2002 | Huang ......................... | 704/229 |

* cited by examiner

*Primary Examiner*—Sinh Tran
*Assistant Examiner*—Con P. Tran
(74) *Attorney, Agent, or Firm*—Carr & Ferrell LLP

(57) ABSTRACT

An engine for processing functions used in audio algorithms. The engine runs in parallel with a digital signal processor (DSP) in an audio chip to increase performance for that chip. Functions performed by the engine include biquad filtering and inverse discrete cosine transform (IDCT) including pre-multiplication, inverse Fast Fourier transform (IFFT), and post-multiplication, which would otherwise be performed by the DSP. The DSP is therefore free to perform other functions demanded by the chip. Resources in the engine are processed in a pipeline structure and are thus highly utilized. Data are stored in a predefined order to increase efficiency.

1 Claim, 17 Drawing Sheets

| Cycle | MPY 326 | ALU 330 | RRAM 304 | IRAM 308 |
|---|---|---|---|---|
| 1 | | | read $b_2$ | read $x_{n-2}$ |
| 2 | | | read $b_1$ | read $x_{n-1}$ |
| 3 | $b_2*x_{n-2}$ | | read $b_0$ | read $x_n$ |
| 4 | $b_1*x_{n-1}$ | | read $a_2$ | read $yl_{n-2}$ |
| 5 | $b_0*x_n$ | | | read $y_{n-2}$ |
| 6 | $a_2*yl_{n-2}$ | $A=b_2*x_{n-2}$ | read $a_1$ | |
| 7 | $a_2*y_{n-2}$ | $A=A+(b_1*x_{n-1})$ | | |
| 8 | $a_1*yl_{n-1}$ | $A=A+(b_0*x_n)$ | | |
| 9 | $a_1*y_{n-1}$ | $A=A+(a_2*yl_{n-2})$ | | |
| 10 | | $A=A+(a_2*y_{n-2})$ | | |
| 11 | | $A=A+(a_1*yl_{n-1})$ | | |
| 12 | | $A_0=A+(a_1*y_{n-1})$ | | |
| 13 | | | | |
| 14 | | | | |
| 15 | | | | |
| 16 | | | | |
| 17 | | | | write $yl_n$ ($B_0$) |
| 16 | | | | write $y_n$ ($A_0$) |

| Cycle | MPY 326 | ALU A | ALU B | RRAM 304 | IRAM 308 | ROM 312 |
|---|---|---|---|---|---|---|
| 1 |  |  |  | read $b_r$ | read $b_i$ | read $c_r$ |
| 2 |  |  |  |  |  | read $c_i$ |
| 3 | $b_r * c_r$ |  |  |  |  | read $c_i$ |
| 4 | $b_i * c_i$ |  |  |  |  | read $c_r$ |
| 5 | $b_r * c_i$ |  |  |  |  |  |
| 6 | $b_i * c_r$ | $A = b_r * c_r$ |  |  |  |  |
| 7 |  | $A_0 = A - (b_i * c_i)$ |  |  |  |  |
| 8 |  |  | $B = b_r * c_i$ |  |  |  |
| 9 |  |  | $B_0 = B + (b_i * c_r)$ |  |  |  |
| 10 |  |  |  | write $b_r$ | write $b_i$ |  |
| 11 |  |  |  |  |  |  |
| 12 |  |  |  |  |  |  |

FIG. 4A

| Cycle | MPY 326 | ALU A | ALU B | RRAM 304 | IRAM 308 | ROM 312 |
|---|---|---|---|---|---|---|
| 1 | 1 | 0 | 1 | 1 | 1 | 1 |
| 2 | 1 | 1 | 0 | 1 | 1 | 1 |
| 3 | 1 | 1 | 0 | 0 | 0 | 1 |
| 4 | 1 | 0 | 1 | 0 | 0 | 1 |

FIG. 4B

| Cycle | MPY 326 | ALU A | ALU B | RRAM 304 | IRAM 308 | ROM 312 |
|---|---|---|---|---|---|---|
| 1 | | | | read $b_r$ | | read $c_r$ |
| 2 | | | | | read $b_i$ | read $c_i$ |
| 3 | $b_r*c_r$ | | | | | read $c_i$ |
| 4 | $b_i*c_i$ | | | | | read $c_r$ |
| 5 | $b_r*c_i$ | $A=b_r*c_r$ | | | | |
| 6 | $b_i*c_r$ | $A=A-b_i*c_i$ | | | | |
| 7 | | $A_1=a_r-A$ | $B=b_r*c_i$ | read $a_r$ | | |
| 8 | | $A_0=a_r+A$ | $B=B+(b_i*c_r)$ | | | |
| 9 | | | $B_1=a_i-B$ | | read $a_i$ | |
| 10 | | | $B_0=a_i+B$ | write $A_1$ | | |
| 11 | | | | write $A_0$ | write $B_1$ | |
| 12 | | | | | write $B_0$ | |

FIG. 5A

| Cycle | MPY 326 | ALU A | ALU B | RRAM 304 | IRAM 308 | ROM 312 |
|---|---|---|---|---|---|---|
| 1 | 1 | 1 | 1 | | | 1 |
| 2 | 1 | 1 | 1 | 1 | 1 | 1 |
| 3 | 1 | 1 | 1 | 1 | 1 | 1 |
| 4 | 1 | 1 | 1 | 1 | 1 | 1 |

FIG. 5B

```
Group = 1;
Block = FFT Length / 2;                 /* 64 or 32 */
R2P = Log (FFT Length) ;                /* 7 or 6 */
for(i=0;i<R2P;i++)                      /* radix 2 pass counter */
    {
    Aiptr=0;                            /* initialize A imaginary pointer */
    Arptr=0;                            /* initialize A real pointer */
    Biptr=Block;                        /* initialize B imaginar pointer */
    Brptr=Block;                        /* initialize B real pointer */
    for(j=0;j<Group;j++)
        {
        for(k=0;k<Block;k++)
            {
            /* perform butterfly here */ ar = *Arptr;                /* fetch data */
            ai = *Aiptr;
            br = *Brptr;
            bi = *Biptr;

rtemp = br * cr – bi * ci;  /* perform complex multiply */
            itemp = br * ci + bi * cr;

*Arptr++ = ar - rtemp;      /* update and write back data */
            *Aiptr++ = ai – itemp;
            *Brptr++ = ar + rtemp;
            *Biptr++ = ai + itemp;
            }
        Aiptr+=block;                   /* update addresses to next group */
        Arptr+=Block;
        Biptr+=Block;
        Brptr+=Block;
        }
    Block>>=1;                          /* update block size for next radix 2 pass */
    Group<<=1;                          /* update group size for next radix 2 pass */
    }
```

FIG. 5C

| Cycle | MPY 326 | ALU 330 | RRAM 304 | IRAM 308 |
|---|---|---|---|---|
| 1 | | | read $b_2$ | read $x_{n-2}$ |
| 2 | | | read $b_1$ | read $x_{n-1}$ |
| 3 | $b_2 * x_{n-2}$ | | read $b_0$ | read $x_n$ |
| 4 | $b_1 * x_{n-1}$ | | read $a_2$ | read $y_{n-2}$ |
| 5 | $b_0 * x_n$ | | read $a_1$ | |
| 6 | $a_2 * y_{n-2}$ | $A = b_2 * x_{n-2}$ | | |
| 7 | $a_1 * y_{n-1}$ | $A = A + (b_1 * x_{n-1})$ | | |
| 8 | | $A = A + (b_0 * x_n)$ | | |
| 9 | | $A = A + (a_2 * y_{n-2})$ | | |
| 10 | | $A_0 = (A + (a_1 * y_{n-1})) * 2$ | | |
| 11 | | | | |
| 12 | | | | write $y_n$ ($A_0$) |

FIG. 6A

| Cycle | MPY 326 | ALU 330 | RRAM 304 | IRAM 308 |
|---|---|---|---|---|
| 1 | 1 | 1 | 1 | 1 |
| 2 | 0 | 1 | 1 | 1 |
| 3 | 1 | 1 | 1 | 1 |
| 4 | 1 | 1 | 1 | 1 |
| 5 | 1 | 0 | 1 | 0 |
| 6 | 1 | 1 | 0 | 1 |

FIG. 6B

| Address | Initial Data | Data n=0 | Data n=1 | Data n=2 | ... | Data n=123 |
|---|---|---|---|---|---|---|
| 0 | $y_{-2}$ | $y_{-2}$ | $y_{-2}$ | $y_{-2}$ | | $y_{-2}$ |
| 1 | $y_{-1}$ | $y_{-1}$ | $y_{-1}$ | $y_{-1}$ | | $y_{-1}$ |
| 2 | $x_{-2}$ | $y_0$ | $y_0$ | $y_0$ | | $y_0$ |
| 3 | $x_{-1}$ | $x_1$ | $y_1$ | $y_1$ | | $y_1$ |
| 4 | $x_0$ | $x_0$ | $x_0$ | $y_2$ | | $y_2$ |
| 5 | $x_1$ | $x_1$ | $x_1$ | $x_1$ | | $y_3$ |
| . | . | . | $x_2$ | $x_2$ | | $y_4$ |
| . | . | . | . | $x_3$ | | . |
| . | . | . | . | . | | . |
| . | . | . | . | . | | . |
| . | . | . | . | . | | . |
| . | . | . | . | . | | . |
| . | . | . | . | . | | . |
| . | . | . | . | . | | . |
| . | . | . | . | . | | . |
| 124 | $x_{120}$ | $x_{120}$ | $x_{120}$ | $x_{120}$ | | $y_{122}$ |
| 125 | $x_{121}$ | $x_{121}$ | $x_{121}$ | $x_{121}$ | | $y_{123}$ |
| 126 | $x_{122}$ | $x_{122}$ | $x_{122}$ | $x_{122}$ | | $x_{122}$ |
| 127 | $x_{123}$ | $x_{123}$ | $x_{123}$ | $x_{123}$ | | $x_{123}$ |

FIG. 6E

| Cycle | MPY 326 | ALU 330 | RRAM 304 | IRAM 308 |
|---|---|---|---|---|
| 1 | | | read $b_2$ | read $x_{n-2}$ |
| 2 | | | read $b_1$ | read $x_{n-1}$ |
| 3 | $b_2 * x_{n-2}$ | | read $b_0$ | read $x_n$ |
| 4 | $b_1 * x_{n-1}$ | | read $a_2$ | read $yl_{n-2}$ |
| 5 | $b_0 * x_n$ | | | read $y_{n-2}$ |
| 6 | $a_2 * yl_{n-2}$ | $A = b_2 * x_{n-2}$ | read $a_1$ | |
| 7 | $a_2 * y_{n-2}$ | $A = A + (b_1 * x_{n-1})$ | | |
| 8 | $a_1 * yl_{n-1}$ | $A = A + (b_0 * x_n)$ | | |
| 9 | $a_1 * y_{n-1}$ | $A = A + (a_2 * yl_{n-2})$ | | |
| 10 | | $A = A + (a_2 * y_{n-2})$ | | |
| 11 | | $A = A + (a_1 * yl_{n-1})$ | | |
| 12 | | $A_0 = A + (a_1 * y_{n-1})$ | | |
| 13 | | | | |
| 14 | | | | |
| 15 | | | | |
| 16 | | | | |
| 17 | | | | write $yl_n$ ($B_0$) |
| 16 | | | | write $y_n$ ($A_0$) |

FIG. 7A

| Cycle | MPY 326 | ALU 330 | RRAM 304 | IRAM 308 |
|---|---|---|---|---|
| 1 | 0 | 1 | 1 | 1 |
| 2 | 0 | 1 | 1 | 1 |
| 3 | 1 | 1 | 1 | 1 |
| 4 | 1 | 0 | 1 | 1 |
| 5 | 1 | 0 | 0 | 1 |
| 6 | 1 | 1 | 1 | 0 |
| 7 | 1 | 1 | 0 | 0 |
| 8 | 1 | 1 | 0 | 1 |
| 9 | 1 | 1 | 0 | 1 |

FIG. 7B

| Address | Initial Data | Data n=0 | Data n=1 | Data n=2 | | Data n=121 |
|---|---|---|---|---|---|---|
| 0 | $yh_{-2}$ 755 | $yh_{-2}$ 759 | $yh_{-2}$ | $yh_{-2}$ | | $yh_{-2}$ |
| 1 | $yh_{-1}$ | $yh_{-1}$ | $yh_{-1}$ 763 | $yh_{-1}$ | | $yh_{-1}$ |
| 2 | $yl_{-2}$ | $yh_0$ | $yh_0$ | $yh_0$ 769 | | $yh_0$ |
| 3 | $yl_{-1}$ | $yl_{-1}$ | $yh_1$ 704 | $yh_1$ | | $yh_1$ |
| 4 | $x_{-2}$ | $yl_0$ 702 | $yl_0$ | $yh_2$ | | $yh_2$ |
| 5 | $x_{-1}$ | $x_{-1}$ | $yl_1$ 705 | $yl_1$ | | $yh_3$ |
|  | $x_0$ | $x_0$ 703 | $x_0$ | $yl_2$ | | $yh_4$ |
|  |  | $x_1$ | $x_1$ | $x_1$ | | $yh_5$ |
|  |  |  | $x_2$ | $x_2$ | | |
|  |  |  |  | $x_3$ | | |
| ⋮ | ⋮ | ⋮ | ⋮ | ⋮ | ⋮ | ⋮ |
| 124 | $x_{118}$ | $x_{118}$ | $x_{118}$ | $x_{118}$ | | $yh_{120}$ |
| 125 | $x_{119}$ | $x_{119}$ | $x_{119}$ | $x_{119}$ | | $yh_{121}$ |
| 126 | $x_{120}$ | $x_{120}$ | $x_{120}$ | $x_{120}$ | | $yh_{120}$ |
| 127 | $x_{121}$ | $x_{121}$ | $x_{121}$ | $x_{121}$ | | $yh_{121}$ |
|  |  |  |  |  | | $x_{120}$ |
|  |  |  |  |  | | $x_{121}$ |

FIG. 7C

ACCELERATOR ENGINE FOR PROCESSING FUNCTIONS USED IN AUDIO ALGORITHMS

BACKGROUND OF THE INVENTION

1. Technical Field

This invention relates generally to audio digital signal processing (DSP) and more particularly to processing functions used in audio algorithms.

2. Discussion of Background Art

An Inverse Discrete Cosine Transformation (IDCT), which transforms data from the frequency domain to the time domain, requires a pre-multiplication, an inverse Fast Fourier Transformation (IFFT), and a post-multiplication. IDCT is used as one of the last stages of the Dolby®'s third generation audio coding (AC3) decompressing process.

Performing a 128-point IFFT requires 64*7 (=448) radix 2 butterflies, each defined by $$A'=A-BC \text{ and } B'=A+BC,$$

where A, A', B, B' and C are complex numbers in the form of $D=d_r+jd_i$. A subscript r denotes the real part, and a subscript i denotes the imaginary part of the complex number.

FIG. 1 shows an audio integrated circuit chip 100 that includes a DSP 102, a Random Access Memory (RAM) 106, a Read Only Memory (ROM) 110, and an Input/Output (I/O) interface 114. DSP 102 provides the main digital signal processing for chip 100 including, for example, filtering and transforming audio samples. RAM 106 is a "memory on chip" used by programs running on DSP 102 to store data relating to input audio samples and the processing performed on those samples. ROM 110 stores additional data for DSP 102. I/O interface 114 implements various protocols for exchanging, via databus 4005, audio samples with external devices such as analog-to-digital (A/D) and digital-to-analog (D/A) converters, etc.

As audio AC3 and surround sound features are added to chip 100, DSP 102 cannot perform as fast as desired, that is, it cannot execute as many million instructions per second (MIPs) as are required to do all of the tasks demanded by chip 100, including, for example, receiving AC3 data, detecting AC3 data error, using IDCT to decode data, and performing audio enhancement and 3D features. One approach to improving DSP 102 performance, or to conserving DSP 102 MIPs for other desired functions, accelerates the AC3 decompressing stage. However, this approach requires operations that are tightly coupled with the AC3 algorithm, which in turn requires that a designer be intimately familiar with the AC3 decoding process. Further, the approach is useful for accelerating AC3, but provides no benefits for other audio functions or Moving Picture Expert Group (MPEG) functions.

Therefore, what is needed is a mechanism to efficiently improve performance of DSP 102, and thereby performance of chip 100.

SUMMARY OF THE INVENTION

The present invention provides an accelerator engine running in parallel with a DSP in an audio chip to improve its performance. The engine avoids AC3-specific algorithms and focuses on general purpose DSP functions, including biquad filtering and IDCT, that comprise pre-multiplication, IFFT, and post-multiplication. The DSP is therefore free to do other processing while the engine is performing a requested function. The engine utilizes its resources in a pipeline structure for increased efficiency. In the biquad and double precision biquad modes the engine stores data in predefined locations in memory to efficiently access the data. The engine also uses an equation and data values stored in the predefined locations to calculate an audio sample. The calculated result is then stored in a memory location in a way that it can easily be used to calculate the next sample. In a preferred embodiment the engine efficiently saves 15 MIPs in an AC3 based 3D audio product, including 7.5 MIPs in the AC3 decoding process by accelerating the IFFT, and 7.5 MIPs from the 3D processing via a biquad filtering function.

BRIEF DESCRIPTION OF THE DRAWINGS

FIG. 4A shows a pipeline structure for the pre-multiplication mode;

FIG. 4B shows a resource utilization map for the pre-multiplication mode;

FIG. 5A shows a pipeline structure for the FFT mode;

FIG. 5B shows a resource utilization map for the FFT mode;

FIG. 5C shows C code describing the address generation for both 128-point and 64-point FFTs;

FIG. 6A shows a pipeline structure for the biquad filtering mode;

FIG. 6B shows a resource utilization map for the biquad filtering mode;

FIG. 6E illustrates data in memory during a biquad filtering mode;

FIG. 7A shows a pipeline structure for the double precision biquad filtering mode;

FIG. 7B shows a resource utilization map for the double precision biquad filtering mode:

FIG. 7C illustrates data in memory during a double precision biquad filtering mode.

DETAIL DESCRIPTION OF THE PREFERRED EMBODIMENT

The present invention provides an accelerator engine running in parallel with a DSP for processing functions that are usable by audio algorithms including, for example, AC3, 3D, bass managements, MP3, etc., and that would otherwise be performed by the DSP. Consequently, the DSP is free to process other tasks.

Figure 1:
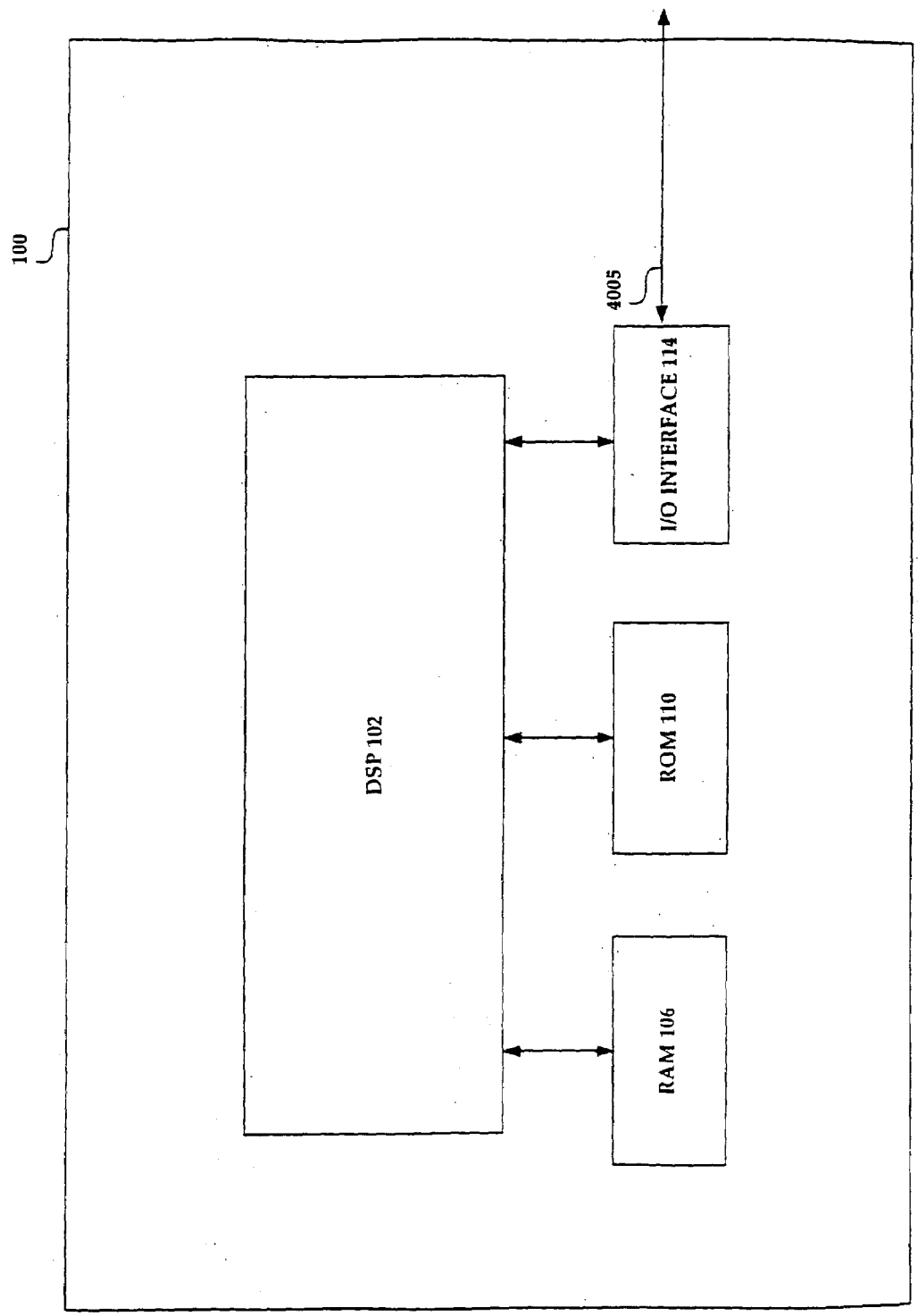
FIG. 1 shows a prior art DSP chip.
Figure 2:
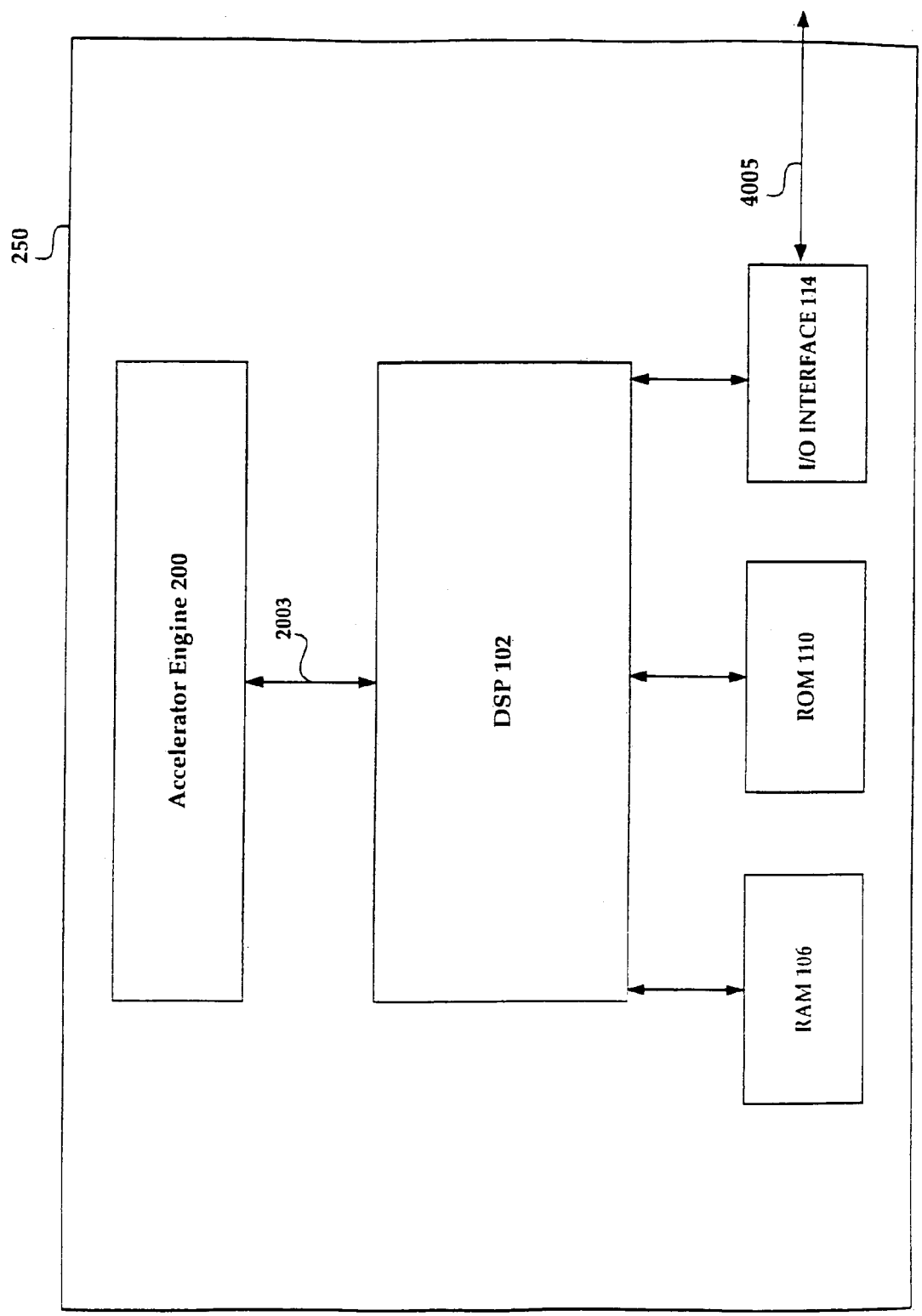
FIG. 2 shows a chip utilizing the accelerator engine according to the invention.

FIG. 2 shows a chip 250 utilizing the invention. Integrated circuit chip 250 is like chip 100 except that chip 250 includes an accelerator engine 200 interfacing via data bus 2003 with DSP 102. Data passing through databus 2003 includes configuration information and data for accelerator engine 200 to perform a requested function.

Figure 3:
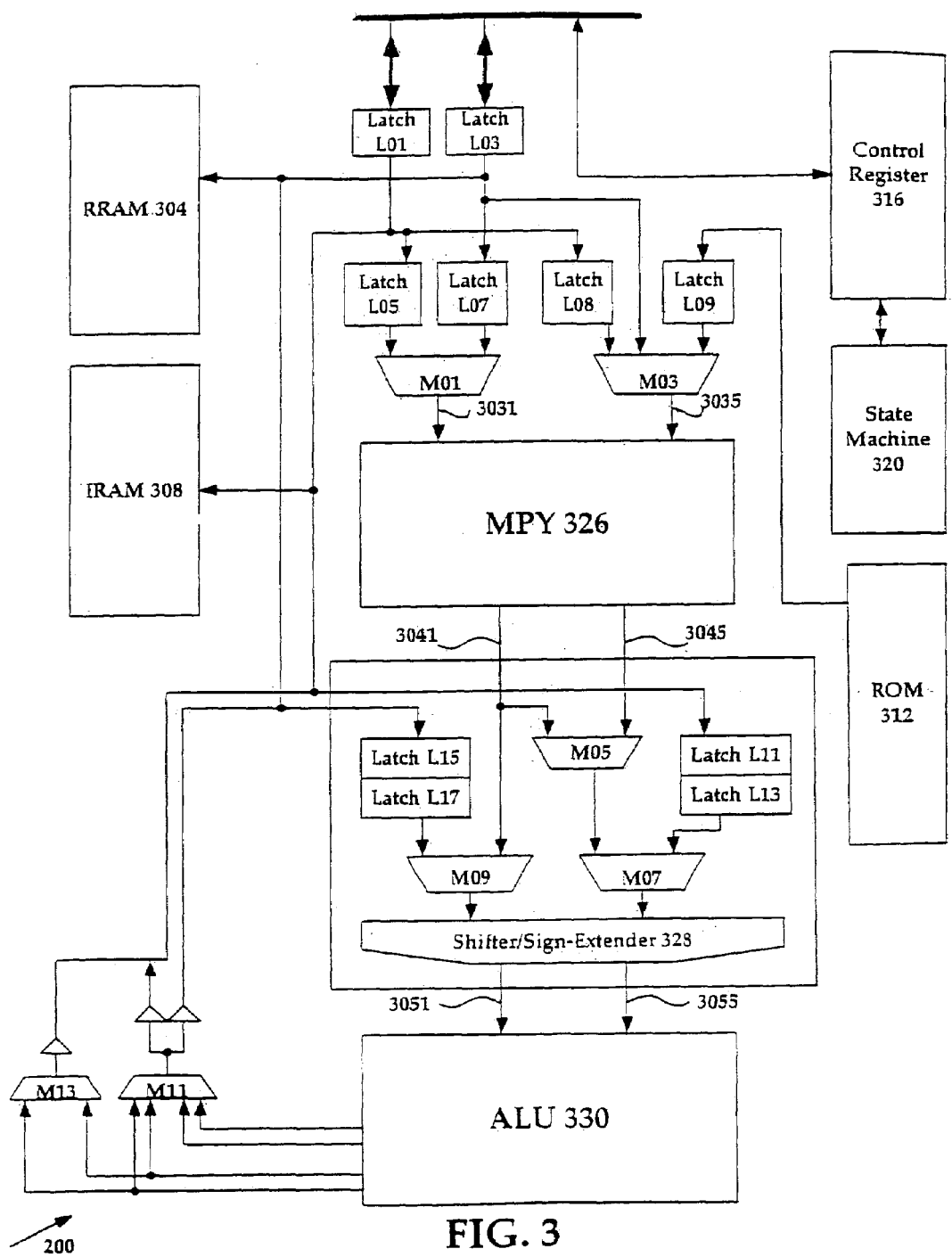
FIG. 3 is a block diagram of the accelerator engine.

FIG. 3 is a block diagram of accelerator engine 200 preferably including an RRAM 304, an IRAM 308, a ROM 312, a control register 316, a state machine 320, a multiplier (MPY) 326, a shift/sign extender 328, an ALU 330, and other components. In the preferred embodiment accelerator engine 200 supports the following functions: single biquad filtering; double precision biquad filtering; radix2, 7 passes, 128-point IFFT; radix2, 6 passes, 64-point IFFT, premultiplication 128-word and 64-word configurations, post-multiplication 128-word and 64-word configurations. IDCT 128-word and 64-word configurations, and BFE-RAM read/write.

RRAM 304, depending on the required function, stores different types of values. For example, for a biquad filtering function, RRAM 304 stores filter coefficients. For IFFT and IDCT functions, RRAM 304 stores real parts and IRAM 308 stores imaginary parts of complex numbers required by these functions. Data in RRAM 304 and IRAM 308, where appropriate, contains new values after each time accelerator engine 200 has calculated an audio sample.

ROM 312 is used in IFFT and IDCT modes preferably to store both real and imaginary values for complex numbers required by IFFT and IDCT functions.

State machine 320 generates addresses for RRAM 304, IRAM 308, and ROM 312 and control signals for other circuitry of accelerator engine 200.

MPY 326 is preferably a conventional 24-bit multiplier for multiplying data on lines 3031 and 3035.

Shifter/Sign-Extender 328 shifts its contents to adjust or mask a sign bit on lines 3041 and 3045.

ALU 330 is preferably a conventional ALU which accumules, adds, or subtracts data on lines 3051 and 3055. ALU 330 can be divided into an ALUA (not shown) and an ALUB (not shown) for use when two ALUs are required, such as in the pre-multiplication, IFFT, and post-multiplication modes.

Multiplexers (MUXes) M01, M03, M05, M07, M09, M11, and M13 perform conventional functions of MUXes, that is, passing selected inputs based on select signals (not shown) provided by state machine 320 and appropriate circuitry.

Latches L01, L03, L05, L07, L08, L09, L11, L13, L15, and L17 perform conventional functions of latches including passing inputs based on clocking signals (not shown) provided by state machine 320 and appropriate circuitry.

This specification uses the following notations in several tables for a pipeline structure and for a resource utilization map. Each column represents a critical resource (RRAM 304, IRAM 308, MPY 326, etc.). Each row represents a phase-one-to-phase-one clock cycle, which lasts 20 ns in a preferred embodiment. The tables show what each resource is doing during each cycle. In a resource utilization map, the number in each entry represents the number of operations a resource is executing during a given cycle. A "0" indicates a resource is idle; a "1" indicates a resource is busy.

In the preferred embodiment the pre- and post-multiplication modes pass data and multiply each data item by a unique complex constant preferably stored in ROM 312, that is, $A_n = A_n C_n$ where $A_n = a_m + ja_{in}$ and $C_n = c_m + jc_{in}$.

Parameters $a_m$ and $a_{in}$ represent data in RRAM 304 and IRAM 308, respectively, and $C_n$ are filter coefficients in ROM 312. In the preferred embodiment, n ranges from 0 to 127 (for 128 data points). The pre- and post-multiplication modes are identical except that data is accessed linearly in the pre-multiplication mode and in bit-reverse order in the post-multiplication mode because the IFFT mode leaves its results in bit-reverse order. Coefficients are accessed linearly in both the pre- and the post-multiplication modes.

FIG. 4A shows a pipeline structure for the pre-multiplication mode. In cycle 1 accelerator engine 200 reads $b_r$ from RRAM 304, $b_i$ from IRAM 308, and $c_r$ from ROM 312. In cycle 2 accelerator engine 200 reads $c_i$ from ROM 312. In cycles 3 through 6 MPY 326 performs $b_r*c_r$, $b_i*c_i$, $b_r*c_i$, and $b_i*c_r$, respectively. Accelerator engine 200, instead of using the same $c_r$ and $c_i$ that were read from ROM 312 in cycles 1 and 2, rereads $c_i$ and $c_r$ from ROM 312 in cycles 3 and 4. Rereading these values in cycles 3 and 4 avoids using a register to store the values read in cycles 1 and 2. Further, ROM 312 is available for accessing its data in cycles 3 and 4. ALUA in cycles 6 and 7 performs $A = b_r*c_r + 0$ and $A_0 = A - (b_i*c_i)$, respectively. ALUB in cycles 8 and 9 performs $B = b_r*c_i$ and $B_0 = B + (b_i*c_r)$, respectively. In cycle 10 accelerator engine 200 writes $b_r$ and $b_i$ into RRAM 304 and IRAM 308, respectively. In this pipeline structure, data required for a function in each cycle is made available before the data is needed. For example, $b_r$ and $c_r$ used by MPY 326 in cycle 3 have been made ready to MPY 326 by reading RRAM 304 and IRAM 308 in cycle 1.

FIG. 4B shows a resource utilization map for the pre-multiplication mode, which, starting on any four cycle boundary and taking four cycles, shows the number of operations a resource is executing. For example, MPY 326 and ROM 312 perform four operations (all four 1's), one in each of the four selected cycles 1 to 4. ALUA performs two operations (one in each of cycles 2 and 3) while ALUB performs two operations (one in each of cycles 1 and 4). Data is accessed in cycles 1 and 2 for RRAM 304 and IRAM 308. Therefore, MPY 326 and ROM 312 are utilized 100% of the time (4 operations in tour cycles) while each of ALUA, ALUB, RRAM 304, and IRAM 308 is utilized 50% of the time (2 operations in 4 cycles).

Accelerator engine 200 preferably uses seven passes of a radix 2 butterfly to process IFFTs, and employs the following equations:

$A' = A - BC$ and $B' = A + BC$, where A, A', B, B', and C are complex numbers.

FIG. 5A shows a pipeline structure for the IFFT mode and FIG. 5B shows a resource utilization map for the IFFT mode. The explanations of this IFFT pipeline structure and resource utilization map are similar to the respective explanations of the pre-multiplication mode in FIGS. 4A and 4B. For example, in cycle 1 accelerator engine 200 reads $b_r$ and $c_r$ from RRAM 304 and ROM 312 respectively; MPY 326 is utilized 100% of the time because in the selected four cycles MPY 326 performs four operations; etc. Consequently, as shown in FIG. 5B, all resources are utilized 100% of the time.

Accelerator engine 200 performs each pass of the IFFT mode sequentially in both 128-point IFFT and 64-point IFFT. The difference between each pass is the method by which data points are addressed. The addressing schemes for the two modes are similar. FIG. 5C lists C-code describing the address generation for both 128-point FFT and 64-point FFT modes.

In the biquad filtering mode, accelerator engine 200 uses the equation:

$$y_n = b_0 x_n + b_1 x_{n-1} + b_2 x_{n-2} + a_1 y_{n-1} + a_2 y_{n-2} \qquad (1)$$

where the subscript n indicates the current sample number; $x_n$ is the current input sample and $y_n$ is the current output sample; and $b_0$, $b_1$, $b_2$, $a_1$, and $a_2$ are filter coefficients.

Accelerator engine 200 stores filter coefficients in RRAM 304 and input samples and filter states in IRAM 308. In the biquad filtering mode, 48-bit ALU 330 remains as one ALU (instead of being divided into two ALUs: ALUA and ALUB).

FIG. 6A shows a pipeline structure for the biquad filtering mode.

FIG. 6B shows a resource utilization map for the biquad filtering mode. This pipeline structure can be repeated every six cycles and all resources will be used five out of every six cycles.

Figure 6C:
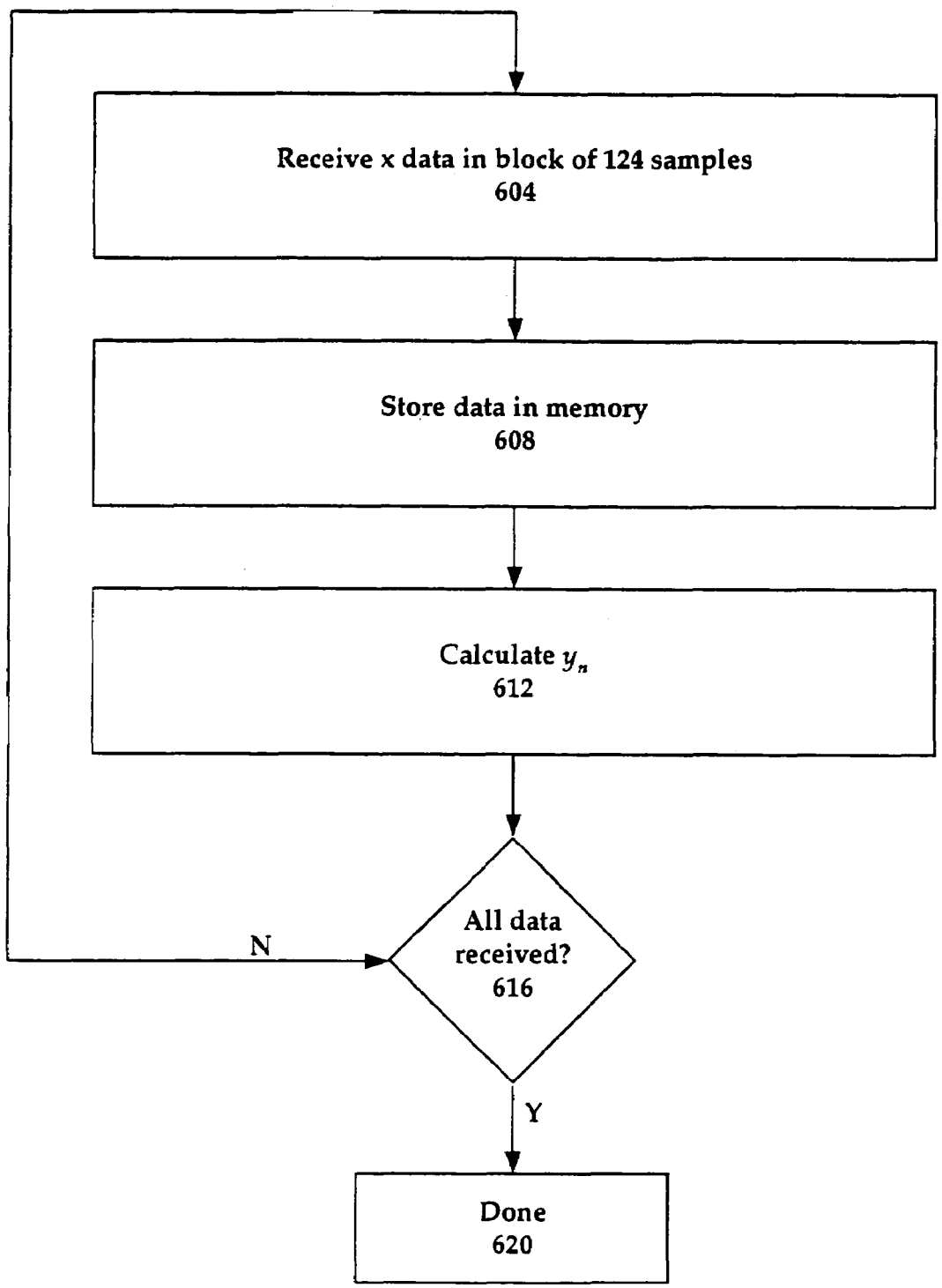
FIG. 6C is a flowchart illustrating how the accelerator engine processes the biquad filtering.

FIG. 6C is a flowchart illustrating a method for accelerator engine 200 to perform a biquad filtering in accordance with the invention. In step 604, accelerator engine 200 receives, for example, 124 sample data points represented by $x_0$ to $x_{123}$. In step 608, accelerator engine 200 stores data in IRAM 308. In step 612, accelerator engine 200 uses equation (1) to calculate $y_n$ for n=0 to n=123, that is, $y_0$ to $y_{123}$, and store them in appropriate locations in IRAM 308. Accelerator engine 200 then continues to receive, store, and calculate sampled data in respective steps 604, 608, and 612 until all data has been received. Then accelerator engine 200 completes the biquad filtering function in step 620.

Figure 6D:
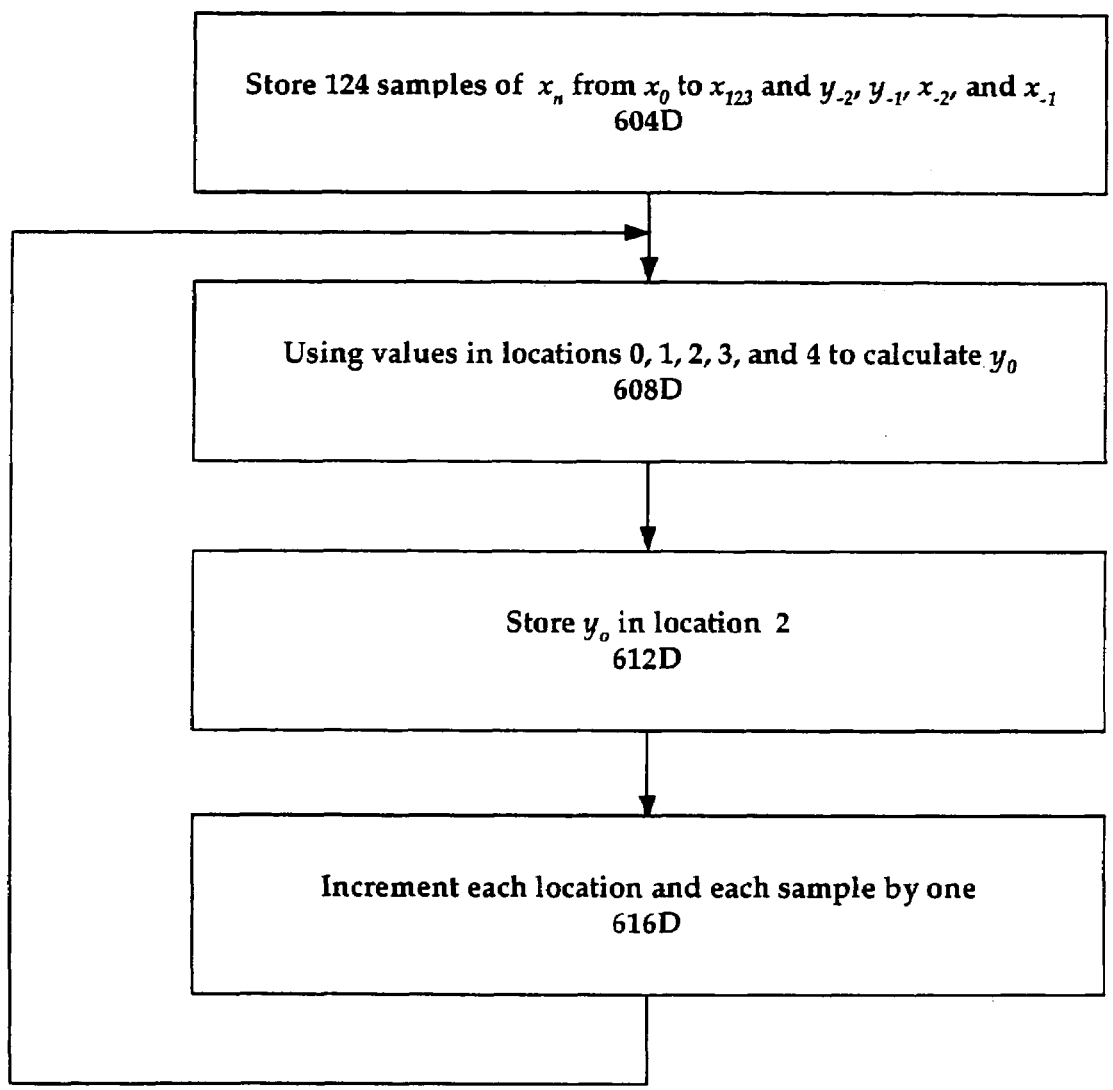
FIG. 6D is a flowchart illustrating how the accelerator engine stores data during the biquad filtering mode.

FIG. 6D is a flowchart illustrating how accelerator engine 200, in accordance with steps 608 and 612 of FIG. 6C, calculates and stores $y_n$ in IRAM 308 locations for 124 samples of $x_n$ from $x_0$ to $x_{123}$. In step 604D accelerator engine 200 stores $x_0$ to $x_{123}$ in locations 4 to location 127. Accelerator engine 200 also stores values of $y_{-2}$, $y_{-1}$, $x_{-2}$, and $x_{-1}$ in locations 0, 1, 2, and 3, respectively. In this FIG. 6D, locations 0 to 127 are used for illustrative purpose only, any 128 locations, for example, 1 to 128, 2 to 129, or K to K+128−1 are applicable. In step 608D accelerator engine 200 uses the values in locations 0, 1, 2, 3, and 4 to calculate $y_0$. In step 612D accelerator engine 200 stores the value of $y_0$ in location 2. Accelerator engine 200 then returns to step 608D to calculate $y_1$ and store $y_1$ in location 3, which is one location higher than location 2 storing $y_0$. Accelerator engine 200 keeps calculating and storing values of y until accelerator engine 200 is done, that is, accelerator engine 200 calculates and stores values of $y_2$ to $y_{123}$ in location 4 through location 125, respectively. Accelerator engine 200, in calculating $y_0$ to $y_{123}$, uses values of $a_2$, $a_1$, $b_2$, $b_1$, and $b_0$ preferably stored in ROM 312. Those skilled in the art will recognize that calculating $y_0$ (n=0), based on equation (1), requires $y_{-2}$, $y_{-1}$, $x_{-2}$, $x_{-1}$, and $x_0$. The invention uses the zero value for each of $y_{-2}$, $y_{-1}$, $x_{-2}$, and $x_{-1}$, to calculate the first sequence of 124 $x_n$ samples.

FIG. 6E illustrates how IRAM 308 stores a data value for each $y_n$ from $y_0$ to $y_{123}$. The "Address" column shows locations from 0 to 127 in IRAM 308. The "Initial Data" column shows data of $y_{-2}$, $y_{-1}$, $x_{-2}$, $x_{-1}$, and $x_0$ to $x_{123}$ in corresponding locations of the "Address" column. Columns n=0, n=1, n=2, n=3, . . . to n=123, show data in IRAM 308 locations for $y_n$ for n=0 to n=123, respectively. Box 655 includes values (of $y_{-2}$, $y_{-1}$, $x_{-2}$, $x_{-1}$, and $x_0$) that are used to calculate $y_0$. Similarly, boxes 659, 663, and 669 include values ($y_{-1}$, $y_0$, $x_{-1}$, etc.) that are used to calculate $y_1$, $y_2$, and $y_3$, respectively. According to the invention, IRAM 308 locations of values in boxes 655, 659, 663 and 669, etc., are increased by one for each increment of n. For example, box 655 includes values in locations 0 through 4, box 659 includes values in locations 1 through 5, box 663 includes values in locations 2 through 6, and box 669 includes values in locations 3 through 7, etc. Arrow 602 indicates that $y_1$ is stored in location three, which is one location higher than the location of $y_0$. Similarly, arrow 604 indicates that $y_2$ is stored in location four, one location higher than the location of $y_1$. Column n=123 shows that $y_0$ to $y_{123}$ are stored in locations 2 to 125, respectively. Consequently, the invention, while writing the result of $y_n$ (e.g., $y_0$ in column n=0) over the oldest x value (e.g., $x_{-2}$ in the "Initial Data" column) permits the data for calculating $y_{n+1}$ (e.g., $y_1$) to appear perfectly ordered in the subsequent five locations (e.g., location 1 through location 5). In accordance with the invention, calculating and storing $y_n$ for subsequent sequences of 124 samples of x, that is, calculating and storing $y_n$ for n=124 to n=247, for n=248 to n=371, and for n=372 to n=495, etc., is similar to calculating and storing $y_n$ for n=0 to n=123. The invention thus uses the same IRAM 308 locations from location 0 to location 127 for calculating and storing $y_n$ for subsequent sequences of 124 samples of x. As discussed above, the invention uses the zero value for $y_{-2}$, $y_{-1}$, $x_{-2}$, and $x_{-1}$ for the first sequence of 124 samples of x. For a second sequence of 124 samples of x the invention uses $y_{122}$, $y_{123}$, $x_{122}$, and $x_{123}$ for $y_{-2}$, $y_{-1}$, $x_{-2}$, and $x_{-1}$, respectively. Similarly, for a third sequence of 124 samples of x the invention uses $y_{246}$, $y_{247}$, $x_{246}$, and $x_{247}$ for $y_{-2}$, $y_{-1}$, $x_{-2}$ and $x_{-1}$, respectively. In calculating $y_n$ accelerator engine 200 stores filter coefficients preferably in RRAM 304 in order of $a_2$, $a_1$, $b_2$, $b_1$, and $b_0$.

The double precision biquad mode is similar to the (single) biquad mode, but the feedback state is stored and calculated as double precision for greater numerical stability. The equation for the double precision biquad mode is $$y_n = b_0 x_n + b_1 x_{n-1} + b_2 x_{n-2} + a_1\, yl_{n-1} + a_2 yl_{n-2} \qquad (2)$$

in which $yl_n$ represents the lower half bits and $yh_n$ represents the upper half bits of $y_n$. In the preferred embodiment, a double precision term $y_n$ comprises 48 bits, and therefore each term $y_{ln}$ and $yh_n$ comprises 24 bits.

FIG. 7A shows a pipeline structure for the double precision biquad mode.

FIG. 7B shows a resource utilization map for the double precision biquad mode. In this mode accelerator engine 200 operates in a pipeline fashion that repeats every nine cycles.

The method for calculating $y_n$ in the double precision mode is similar to that for calculating $y_n$ in the biquad mode except, instead of five values ($x_n$, $x_{n-1}$, $x_{n-2}$, $y_{n-1}$, and $y_{n-2}$) accelerator engine 200 uses seven values ($x_n$, $x_{n-1}$, $x_{n-2}$, $yl_{n-1}$, $yl_{n-2}$, $yh_{n-1}$, and $yh_{n-2}$) as required by equation (2), to calculate each $y_n$. Further, after calculating $y_0$, the invention stores $yh_0$ and $yl_0$ in respective locations 2 and 4. Similarly, after calculating $y_1$, the invention stores $yh_1$ and $yl_1$ in respective locations 3 and 5, each location being one higher than the respective locations of $yh_0$ and $yl_0$. Thus for each $y_n$, the invention stores $yh_n$ and yin each in one location higher than the locations of respective $yh_{n-1}$ and $yl_{n-1}$.

FIG. 7C shows how accelerator engine 200 stores calculating and calculated values in IRAM 308 for the double precision biquad mode. The "Address" column shows locations from 0 to 127 in IRAM 308. The "Initial Data" column shows data of $yh_{-2}$, $yh_{-1}$, $yl_{-2}$, $yl_{-1}$, $x_{-2}$, $x_{-1}$, and $x_0$ to $x_{121}$ in corresponding locations of the "Address" column. Columns 0, 1, 2, 3, . . . to 121 show data in IRAM 308 locations for $x_n$ and $y_n$ for n=0 to n=121, respectively. Box 755 includes values (of $yh_{-2}$, $yh_{-1}$, $yl_{-2}$, $yl_{-1}$, $x_{-2}$, $x_{-1}$, and $x_0$) that are used to calculate $y_0$. Similarly, boxes 759, 763, and 769 include values ($yh_{-1}$, $yh_0$, $yl_{-1}$, $yl_0$, $x_{-1}$, etc.) that are used to calculate $y_1$, $y_2$, and $y_3$, respectively. According to the invention, IRAM 308 locations of values in boxes 759, 763, 769, etc., are increased by one for each increment of n. For example, box 755 includes values in locations 0 through 6, box 759 includes values in locations 1 through 7, box 763 includes values in locations 2 through 8, and box 769 includes values in locations 3 through 9, etc. Arrow 702 indicates that $yh_1$ is stored in location 3, which is one location higher than the location of $yh_0$. Arrow 703 indicates that $yl_1$ is stored in location 5, which is one location higher than the location of $yl_0$. Similarly, arrows 704 and 705 indicate that $yh_2$ and $yl_2$ are each stored in locations one higher than the respective locations of $yh_1$ and $yl_1$, etc. Column n=121 shows that $yh_0$ to $yh_{121}$ are stored in respective locations 2 to 123, while $yl_{120}$ and $yl_{121}$ are stored in respective locations 124 and 125, and $x_{120}$ and $x_{121}$ are stored in respective locations 126 and 127. Consequently, the invention while writing the result of $yh_n$ and $yl_n$ (e.g., $yh_0$ and $yl_0$ in column n=0) over the oldest values of yl and x (e.g., $yl_{-2}$ and $x_{-2}$ in the "Initial Data" column) permits the data for calculating $y_{n+1}$ (e.g., $y_1$) to appear perfectly ordered in the subsequent seven locations (e.g., location one through location seven). As in the biquad filtering mode, calculating and storing $y_n$ for subsequent sequences of 122 samples of x, that is, calculating and storing $y_n$ for n=122 to n=243, for n=244 to n=365, and for n=366 to n=487, etc., is similar to calculating and storing $y_n$ for n=0 to n=122. The invention thus uses the same IRAM 308 locations from location 0 to location 127 for calculating and storing $y_n$ for subsequent sequences of 122 samples of x. As discussed above, the invention uses the zero value for $yh_{-2}$, $yh_{-1}$, $yl_{-2}$, $yl_{-1}$, $x_{-2}$, and $x_{-1}$ for the first sequence of 122 samples of x. For a second sequence of 122 samples of x the invention uses $yh_{120}$, $yh_{121}$, $yl_{120}$, $yl_{121}$, $x_{120}$, and $x_{121}$ for $yh_{-2}$, $yh_{-1}$, $yl_{-2}$, $yl_{-1}$, $x_{-2}$, and $x_{-1}$, respectively. Similarly, for a third sequence of 122 samples of x the invention uses $yh_{242}$, $yh_{243}$, $yl_{242}$, $yl_{243}$, $x_{242}$, and $x_{243}$ for $yh_{-2}$, $yh_{-1}$, $yl_{-2}$, $yl_{-1}$, $x_{-2}$, and $x_{-1}$, respectively. In calculating $y_n$, accelerator engine 200 stores filter coefficients preferably in RRAM 304 in order of $a_2$, $a_1$, $a_2$, $a_1$, $b_2$, $b_1$, $b_0$.

Figure 8:
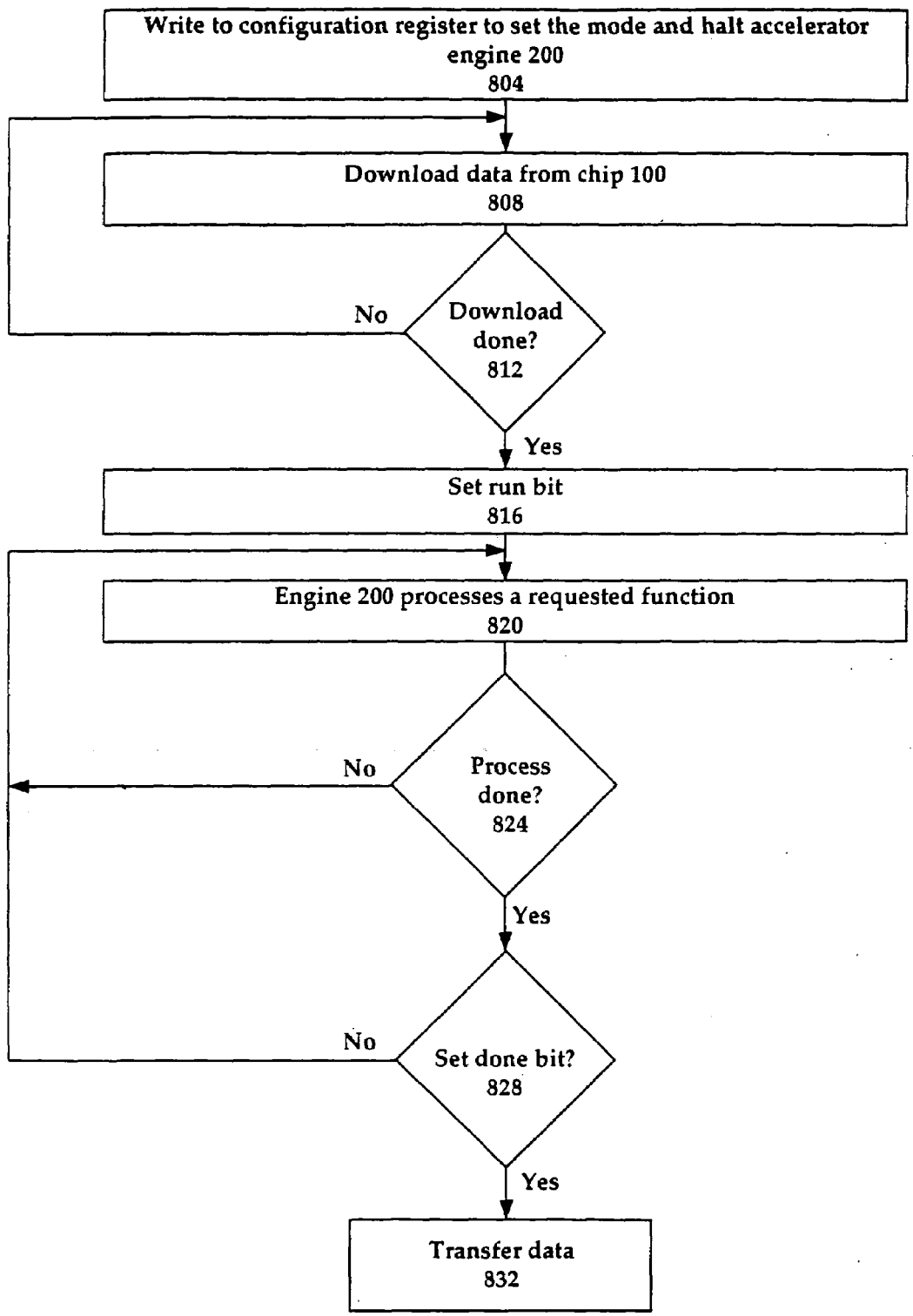
FIG. 8 is a flowchart illustrating how a chip requests that a function be performed by the accelerator engine.

FIG. 8 is a flowchart illustrating how chip 100 invokes a function performed by accelerator engine 200. In step 804 chip 100 writes to configuration register 316 to set the required mode and halt accelerator engine 200. In step 808 chip 100 downloads required data from chip 100 to accelerator engine 200. For the pre-multiplication, IFFT, or post-multiplication modes chip 100 downloads data preferably in the order of 0 to 127 and alternating between RRAM 304 and IRAM 308. For the biquad mode, chip 100 downloads coefficients preferably in the order of $a_2$, $a_1$, $b_2$, $b_1$, and $b_0$ in RRAM 304. Similarly, for the double precision biquad mode, chip 100 downloads coefficients preferably in the order of $a_2$, $a_1$, $a_2$, $a_1$, $b_2$, $b_1$, and $b_0$. Chip 100 also downloads data in the order from 0 to 127, which is the order shown in the "Initial Data" column in FIG. 6E. In step 812 chip 100 determines whether all of the data has been downloaded. If the data is not completely downloaded then chip 100 in step 808 keeps downloading data, but if data is completely downloaded then chip 100 in step 816 sets the run bit in configuration register 316 so that accelerator engine 200 in step 820 can perform the requested function. Chip 100 in step 824 monitors the status of the done bit in configuration register 316 to determine whether accelerator engine 200 has completed its requested task. In step 828 accelerator engine 200 completes its requested task, and, depending on the mode, chip 100 may or may not set the done bit in configuration register 316. For example, if the requested task is a stand-alone pre-multiplication, then chip 100 sets the done bit, but if the task is an IDCT function then chip 100 does not set the done bit because accelerator engine 200 would continue to perform the IFFT function after completing the pre-multiplication function. In step 832 chip 100, via bus 2003 (FIG. 2), reads data from accelerator engine 200 in linear order except in the IFFT mode where IFFT functions leave data in bit-reverse order.

The invention has been explained above with reference to a preferred embodiment. Other embodiments will be apparent to those skilled in the art after reading this disclosure. Therefore, these and other variations upon the preferred embodiment are intended to be covered by the appended claims.

What is claimed is:

1. A method for improving performance of an audio chip including a DSP comprising:
   providing an apparatus having a plurality of elements running in parallel with the DSP;
   configuring the apparatus to perform a function according to a configuration setup; and
   employing the apparatus for accessing data from the plurality of elements in a pipeline structure to maximize utilization of the plurality of elements, wherein data is accessed in a four-cycle pipeline structure in a pre-multiplication function, in an IFFT function, and in a post-multiplication function;
   wherein data is accessed in a six-cycle pipeline structure in a biquad mode; and
   wherein data is accessed in a nine-cycle pipeline structure in a double precision biquad mode.

* * * * *